US012610923B2

(12) United States Patent
Marshall

(10) Patent No.: US 12,610,923 B2
(45) Date of Patent: Apr. 28, 2026

(54) SHOULDER-MOUNTED PLATFORM SYSTEM

(71) Applicant: Michael Marshall, Montreal (CA)

(72) Inventor: Michael Marshall, Montreal (CA)

( * ) Notice: Subject to any disclaimer, the term of this patent is extended or adjusted under 35 U.S.C. 154(b) by 3 days.

(21) Appl. No.: 19/013,566

(22) Filed: Jan. 8, 2025

(65) Prior Publication Data

US 2025/0176494 A1 Jun. 5, 2025

(51) Int. Cl.
*A01K 1/02* (2006.01)

(52) U.S. Cl.
CPC .................................... *A01K 1/029* (2013.01)

(58) Field of Classification Search
CPC ...................................................... A01K 1/029
See application file for complete search history.

(56) References Cited

U.S. PATENT DOCUMENTS

| | | | | | |
|---|---|---|---|---|---|
| 1,191,425 | A | * | 7/1916 | Huddle | A47B 23/002 |
| | | | | | 108/43 |
| 3,767,095 | A | * | 10/1973 | Jones | F16M 13/04 |
| | | | | | 224/907 |
| 4,715,293 | A | * | 12/1987 | Cobbs | F16M 13/00 |
| | | | | | 224/265 |
| 5,363,803 | A | * | 11/1994 | Serro | A01K 31/12 |
| | | | | | 119/537 |
| 5,509,590 | A | * | 4/1996 | Medeiros, Jr. | A47D 13/025 |
| | | | | | 224/161 |
| 5,649,654 | A | * | 7/1997 | Hayward, Jr. | A45F 5/00 |
| | | | | | 224/259 |
| 5,850,956 | A | * | 12/1998 | Hayward, Jr. | A45F 5/00 |
| | | | | | 220/737 |
| 6,561,394 | B2 | * | 5/2003 | Pripps | A47D 13/025 |
| | | | | | 224/159 |
| 11,089,867 | B2 | * | 8/2021 | Mosora | A47B 23/002 |
| 11,503,903 | B2 | * | 11/2022 | Haddy | A47B 3/083 |
| 11,707,049 | B2 | * | 7/2023 | Wiedenhoeft | A45F 3/12 |
| | | | | | 119/28.5 |
| 2016/0270526 | A1 | * | 9/2016 | Siemer | A47B 23/04 |

* cited by examiner

*Primary Examiner* — Timothy D Collins
*Assistant Examiner* — Brittany A Lowery
(74) *Attorney, Agent, or Firm* — Robert Brownstein

(57) ABSTRACT

A shoulder-mounted platform system for supporting a cat on a user's shoulder includes front and rear portions joined by an adjustable strap that extends over the shoulder. Each portion has an inner plate attached to a torso harness, an outer plate coupled to the inner plate, and an upper plate coupled to the outer plate. Adjustable couplings permit lateral translation and vertical-plane rotation of the outer plate and horizontal extension and horizontal-plane rotation of the upper plate to fit different shoulder dimensions. When worn, the upper plates are oriented substantially perpendicular to the shoulder to support the cat facing forward. Upper plates may include apertures to enhance grip.

7 Claims, 5 Drawing Sheets

701

SHOULDER-MOUNTED PLATFORM SYSTEM

TECHNICAL FIELD

The invention is a system for supporting a cat that is situated on a person's shoulder.

BACKGROUND OF INVENTION

Scientists believe that the special relationship between humans and house cats emerged roughly 10,000 years ago. Despite millennia of domestication, many cat behaviors are still governed by instinct. Animal experts posit, for example, that cats that like to sit on a human's shoulder, commonly referred to as shoulder cats, do so to obtain a higher vantage point and to feel safe. When something unexpected happens causing a shoulder cat to begin slipping off a shoulder, its tendency is to claw in in order to stabilize itself. That may result in torn clothing and seriously scratched skin.

Devices have been invented that act as a pet carrier and are worn around the back or the front of the wearer. Some are designed to ride high up, between the shoulders, placing the pet behind the wearer.

Cats, however, when riding on a shoulder, seem to prefer to orient themselves essentially at right angles to the shoulder, facing forward. Owners of shoulder cats who take them on hikes observe that their cats prefer to face forward so they can see in the direction of movement.

A device that acts as a pet carrier and is oriented parallel to the shoulders neglects the cat's instinctive preferred orientation.

BRIEF DESCRIPTION OF THE INVENTION

The invention is a shoulder-mounted platform that sits essentially at right angles to the portion of the shoulder that extends from neck to shoulder joint.

The invention comprises two portions, one in front of the wearer and one behind the wearer, connected by a strap and a harness for securing it to the wearer. Each portion comprises an upper plate structure, an outer plate structure, and an inner plate structure. The upper plates are affixed to the outer plates, which are affixed to the inner plates. The inner plates are attached to the harness.

The connecting strap is an adjustable hook-and-loop material strap that adjusts the displacement between the front and rear portions related to the wearer's shoulder dimensions.

The outer plate is a hinged structure with a portion that is affixed to the inner plate, and a portion that is affixed to the upper plate.

The upper plate, when affixed to the outer plate may be extended horizontally, and rotated horizontally. The portion of the outer plate that is affixed to the inner plate may be extended, right or left, laterally, and rotated in a vertical plane. These adjustments enable the invention to be fitted to a variety of shoulder dimensions.

The harness comprises two horizontally oriented portions that surround the upper torso, and portions that connect the inner plates to the horizontally oriented harness portion. These allow the invention platform to be mounted on either shoulder and to be adjusted to fit the wearer.

DETAILED DESCRIPTION OF INVENTION

The invention is a shoulder-mounted platform upon which a cat may position itself when a wearer is sitting, standing, or walking.

The invention enables the wearer to deploy the platform on either shoulder, and has structural features that enable adjustments to accommodate a wearer's size for optimal fit, comfort, and support.

Figure 1:
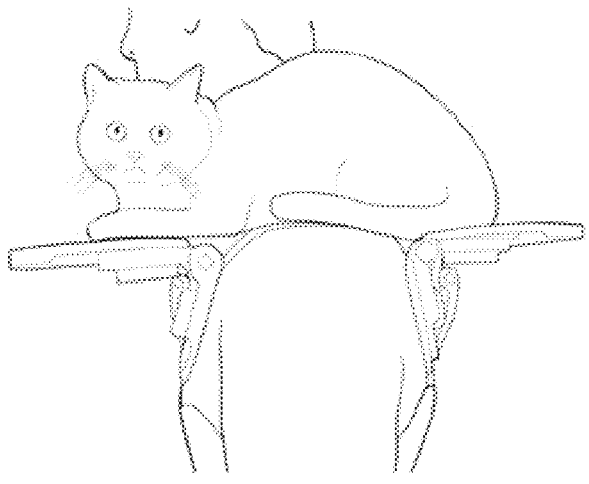
FIG. 1 illustrates the invention worn by a wearer and a cat in place on top.

As shown in FIG. 1, the invention platform rests atop a wearer's shoulder and is oriented such that a cat's body is essentially perpendicular to the wearer's shoulder.

Figure 2:
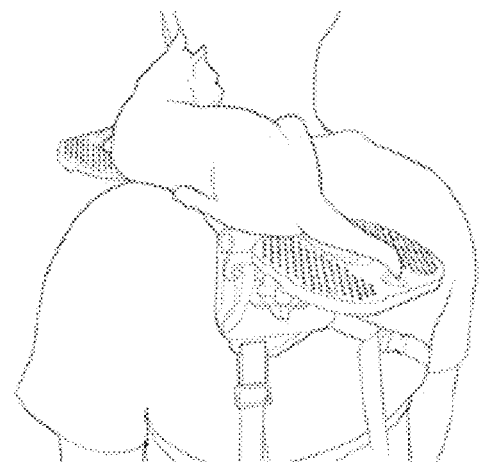
FIG. 2 illustrates the same FIG. 1 from a left-rear perspective.

As shown in FIG. 2, the platform of FIG. 1 is shown from a rear, left-side perspective showing more detail of the harness structure that holds the invention platform in place.

Figure 3:
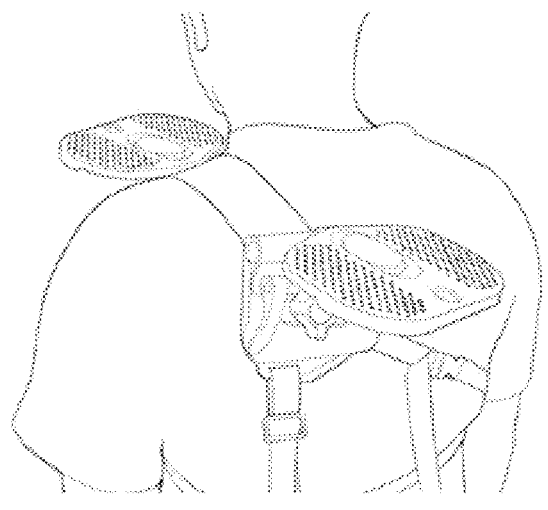
FIG. 3 illustrates the invention deployed on a wearer's left shoulder.

As shown in FIG. 3, the front and back portions of the platform are joined to one another by a strap which sits atop the wearer's shoulder.

Figure 4:
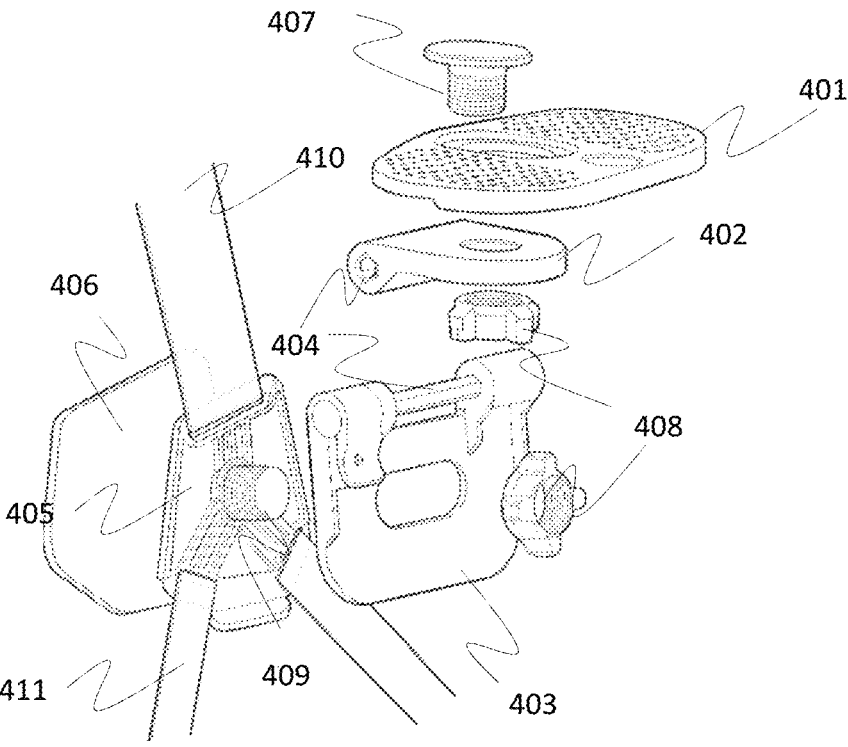
FIG. 4 illustrates an embodiment of the invention showing its structural elements.

FIG. 4 shows the structural elements of the invention platform focusing on one of the two portions. An upper plate, 401, sits atop the horizontal portion of an outer plate structure, 402, and is held in place by a fixture, 407 and 408. The outer-plate portion to which the upper-plate is affixed is hinged (404) to the vertical portion of the outer plate, 403. The outer-plate portion, 403, is held in place by a fixture, 409 and 408, affixing it to the inner plate, 405, and its padded structure, 406. A strapping structure (410) has one end connected to the inner plate (as shown) and its opposite end to the other inner plate (not shown). The inner plate is attached to one portion of the harness, 411, as shown. The other inner plate is connected to another portion of the harness structure (not shown).

Figures 5, 6:
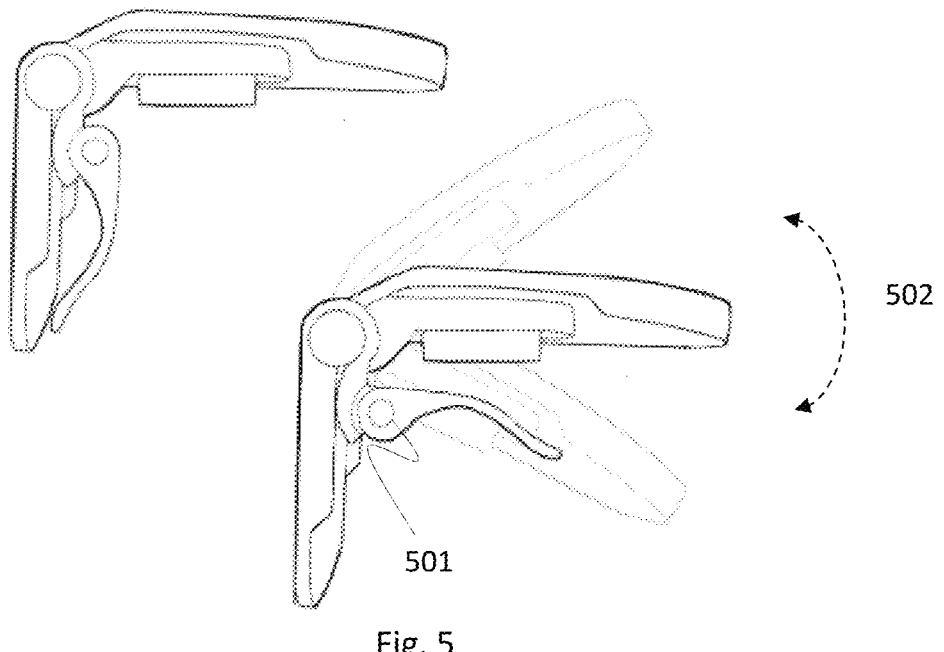
FIG. 5 illustrates a clamping fixture used to adjust the position of an upper plate.
FIG. 6 illustrates the orientation adjustability of embodiment of FIG. 4's structural elements.

As shown in FIG. 5, at least one outer-plate has a clamping fixture, 501, that when unclamped allows the upper plate to rotate up or down as shown (502).

As shown in FIG. 6, the upper plates have an elongated aperture, 601, that allows the upper plate to be extended horizontally (602) and/or rotated (603). The hinging structure that joins the two portions of the outer plate (404) allows the upper plate to be rotated in a vertical plane (502). The outer plate has an elongated aperture (605) that enables the outer plate to be moved laterally with respect to the inner plate (606) and/or rotated in a vertical plane (607). These fixture-based adjustments enable the invention platform to be fitted to a variety of shoulder widths and slopes.

Figure 7:
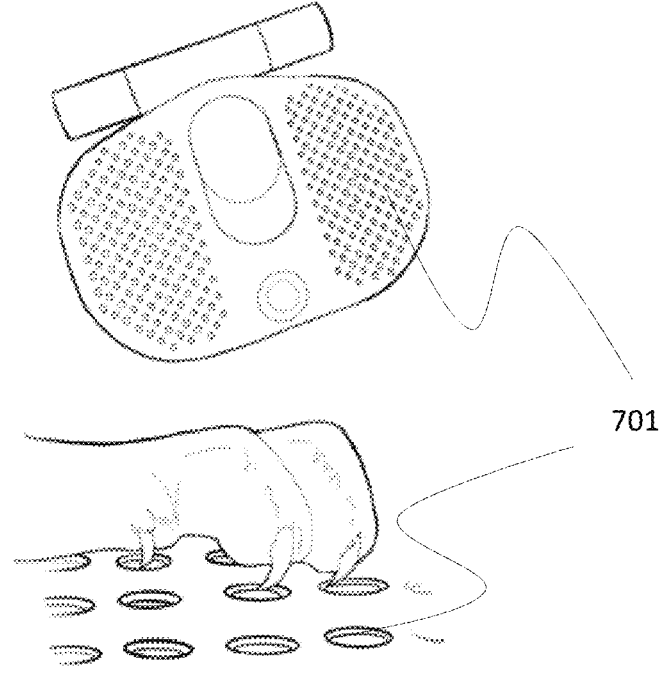
FIG. 7 illustrates the apertures in an embodiment of the upper plate allowing a cat to firmly grasp the upper plate for positional stability.

As shown in FIG. 7, the upper plate has a plurality of apertures that allow a cat to maintain its position by extending its claws into one or more of those apertures (701).

Figure 8:
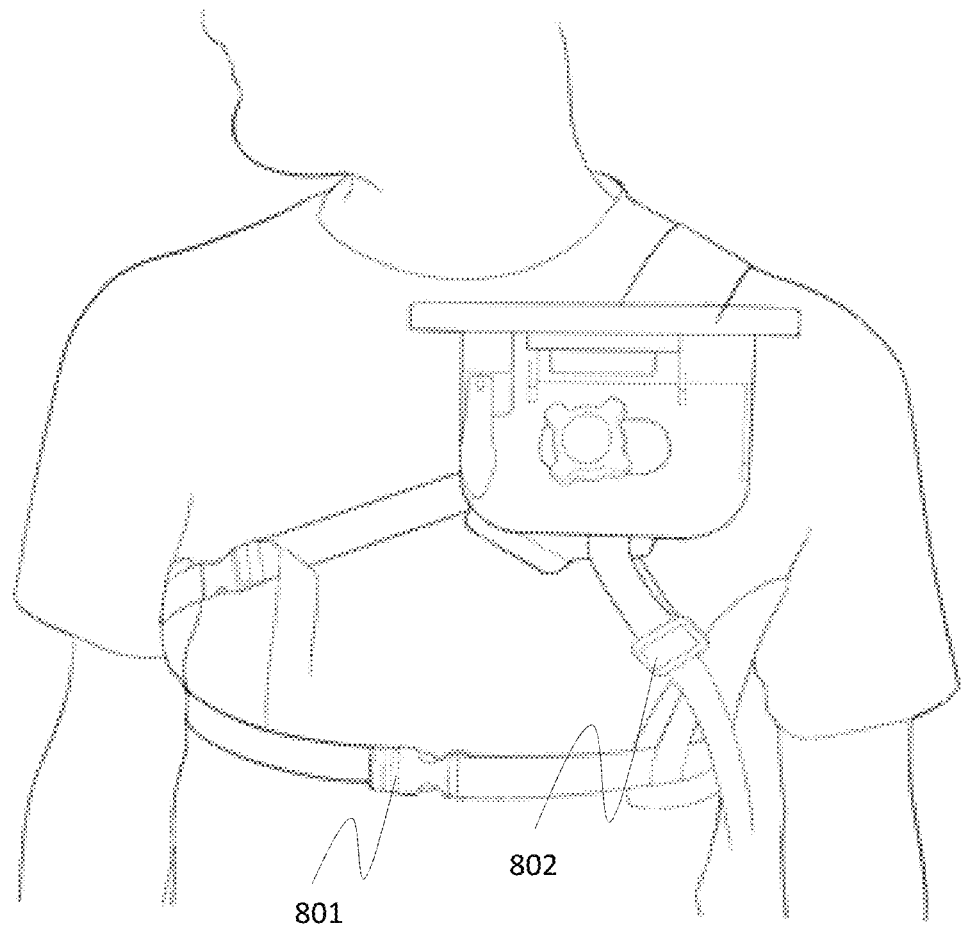
FIG. 8 illustrates the harness buckle and adjustment elements.

As shown in FIG. 8, the harness structure has one or more buckle fixtures, 801, and one or more adjustment structures, 802, which enable quick deployment and adjustment, as well as quick removal of the invention platform from a wearer's shoulder and upper torso.

The upper, outer, and inner plates may be made of any material sufficiently rigid and durable to support a predetermined upper weight limit. As shown in the embodiments, the fixtures that hold the upper plate to outer plate, and outer plate to inner plate, are shown as threaded bolt-and-nut structures. These are exemplary and may be implemented using other fixture structures. The strap that joins the front and rear upper plates is described as hook-and-loop strapping. This is exemplary and may be implemented using other, adjustable-length, strapping materials.

The harness may be made of fabric, leather, vinyl or other similar materials so long as when adjusted, the adjustments are preserved until readjusted.

What is claimed is:

1. A shoulder-mounted platform system configured to support a cat situated on a user's shoulder comprising:
   a front portion and a rear portion, each portion including:
      an upper plate,
      an outer plate, and
      an inner plate;
   a strapping structure extending over the user's shoulder and joining the front portion to the rear portion to set a displacement between the portions in accordance with the user's shoulder dimensions;
   an adjustable harness including a plurality of straps and connectors attaching the inner plates to the torso straps;
   a first adjustable coupling between each upper plate and a corresponding outer plate that permits at least horizontal extension of the upper plate relative to the outer plate and rotation of the upper plate in a horizontal plane;

a second adjustable coupling between each outer plate and a corresponding inner plate that permits at least lateral translation of the outer plate relative to the inner plate and rotation of the outer plate in a vertical plane;
   wherein, when worn, each upper plate is oriented substantially perpendicular to a line extending from the user's neck to the user's shoulder joint, to support the cat facing forward relative to a direction of movement of the user.

2. The system as in claim 1 wherein the first adjustable coupling comprises a fixture joining the upper plate to the outer plate and the second adjustable coupling comprises a fixture joining the outer plate to the inner plate.

3. The system as in claim 2 wherein:
   each outer plate comprises two hinged portions, a first hinged portion affixed to the inner plate and a second hinged portion affixed to the upper plate, the hinge permitting rotation of the second hinged portion in a vertical plane.

4. The system in claim 3 further comprising:
   a clamping fixture associated with the first adjustable coupling and configured, when unclamped, to permit rotation of the upper plate and, when clamped, to lock a selected rotational position.

5. The system as in claim 2 wherein:
   wherein each upper plate includes an elongated aperture through which the first adjustable coupling passes to provide the horizontal extension and rotation of the upper plate.

6. The system as in claim 2 wherein:
   each outer plate includes an elongated aperture through which the second adjustable coupling passes to provide the lateral translation and rotation in the vertical plane.

7. The system as in claim 1 wherein:
   each upper plate includes a plurality of apertures configured to receive claws of the cat to facilitate positional stability.

* * * * *